US011424607B2

(12) United States Patent
Kutsch et al.

(10) Patent No.: US 11,424,607 B2
(45) Date of Patent: *Aug. 23, 2022

(54) EXPLOSION-PROOF ASSEMBLY AND METHOD FOR PRODUCING SAME

(71) Applicant: R. STAHL Schaltgeräte GmbH, Waldenburg (DE)

(72) Inventors: Maxim Kutsch, Heilbronn (DE); Fabian Roll, Untermuenkheim (DE)

(73) Assignee: R. STAHL Schaltgeräte GmbH, Waldington (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/748,540

(22) PCT Filed: Jul. 5, 2016

(86) PCT No.: PCT/EP2016/065819
§ 371 (c)(1),
(2) Date: Jan. 29, 2018

(87) PCT Pub. No.: WO2017/016819
PCT Pub. Date: Feb. 2, 2017

(65) Prior Publication Data
US 2018/0219368 A1 Aug. 2, 2018

(30) Foreign Application Priority Data
Jul. 28, 2015 (DE) .................. 102015112287.1

(51) Int. Cl.
*H02G 15/013* (2006.01)
*H02G 3/08* (2006.01)
(Continued)

(52) U.S. Cl.
CPC ........... *H02G 15/013* (2013.01); *H02G 3/088* (2013.01); *H02G 3/22* (2013.01); *H02G 3/0625* (2013.01)

(58) Field of Classification Search
CPC .... H01B 17/58; H01B 17/583; H01B 17/308; H01R 13/527; H02G 3/22; H02G 3/0625;
(Continued)

(56) References Cited

U.S. PATENT DOCUMENTS 3,605,076 A * 9/1971 Dozier ................. H01B 17/306
174/153 R
5,213,520 A * 5/1993 Casey .................. H01R 13/748
174/77 R
(Continued)

FOREIGN PATENT DOCUMENTS

DE 3710276 A1 * 10/1988 ............. H02G 3/088
DE 102011001985 A1 * 10/2012 ............. H02G 3/083
(Continued)

*Primary Examiner* — Paresh Paghadal
(74) *Attorney, Agent, or Firm* — Leydig, Voit & Mayer Ltd.

(57) ABSTRACT

An explosion-proof assembly (20) is provided for guiding at least one conductor device (21) through a wall without ignition transmission. The assembly (20) has at least one bushing part (24) arranged in the wall having one or more bushing openings, each of which is delimited in the circumferential direction by a bushing surface. A connecting body (23) is associated with each conductor device (21) coaxially surrounds a mounting portion of the conductor device (21) in a flamegap-free connection. The connecting body (23) has a first outer delimiting surface and the bushing opening defines a second delimiting surface. A flameproof Ex gap (34) is formed between the two delimiting surfaces by at least partial insertion of the connecting body (23) into the bushing opening. Bushing openings without a connecting body (23) are closed in a flameproof manner by a closure member (70). A securing device (52) secures the connecting body (23) in the bushing opening (48).

13 Claims, 6 Drawing Sheets

(51) Int. Cl.
  *H02G 3/22* (2006.01)
  *H02G 3/06* (2006.01)

(58) Field of Classification Search
  CPC ........ H02G 3/088; H02G 15/013; H02B 1/28; H01H 9/042
  See application file for complete search history.

(56) References Cited

U.S. PATENT DOCUMENTS

| | | | | |
|---|---|---|---|---|
| 5,399,807 | A * | 3/1995 | Yarbrough | H02G 3/22 |
| | | | | 174/653 |
| 6,286,373 | B1 * | 9/2001 | Lister | G01F 1/8409 |
| | | | | 439/709 |
| 7,615,715 | B2 * | 11/2009 | Hofmann | H02G 15/04 |
| | | | | 174/668 |
| 7,780,173 | B2 * | 8/2010 | Mullaney | F16L 5/08 |
| | | | | 174/77 R |
| 9,735,561 | B2 * | 8/2017 | Schwarz | H02G 3/0658 |
| 2004/0080119 | A1 * | 4/2004 | Goll | F16L 5/08 |
| | | | | 277/607 |
| 2006/0261560 | A1 * | 11/2006 | Radliff | F16L 5/08 |
| | | | | 277/345 |
| 2008/0314637 | A1 * | 12/2008 | Hofmann | H02G 15/04 |
| | | | | 174/668 |
| 2010/0065305 | A1 * | 3/2010 | Bernauer | H01R 13/5219 |
| | | | | 174/152 G |
| 2012/0281419 | A1 * | 11/2012 | Roll | F21V 5/008 |
| | | | | 362/311.02 |
| 2013/0014974 | A1 * | 1/2013 | Burke | G02B 6/4444 |
| | | | | 174/135 |
| 2013/0106060 | A1 * | 5/2013 | Beele | F16L 5/10 |
| | | | | 277/314 |
| 2013/0161913 | A1 * | 6/2013 | Beele | F16L 5/10 |
| | | | | 277/606 |
| 2015/0060445 | A1 * | 3/2015 | Mann | A62C 3/16 |
| | | | | 220/88.2 |
| 2015/0171606 | A1 * | 6/2015 | Wondrak | H02G 3/088 |
| | | | | 174/50 |
| 2015/0303675 | A1 * | 10/2015 | Schwarz | H02G 3/0658 |
| | | | | 174/77 R |

FOREIGN PATENT DOCUMENTS

| | | | | |
|---|---|---|---|---|
| DE | 102012111270 A1 | * | 5/2014 | ........... H02G 3/0658 |
| EP | 0309895 A2 | * | 4/1989 | ............. H02G 3/088 |
| WO | WO-2013185979 A1 | * | 12/2013 | ............. H02G 3/088 |
| WO | WO-2014079688 A1 | * | 5/2014 | ........... H02G 3/0658 |
| WO | WO-2015106996 A1 | * | 7/2015 | ............. H02G 3/088 |

* cited by examiner

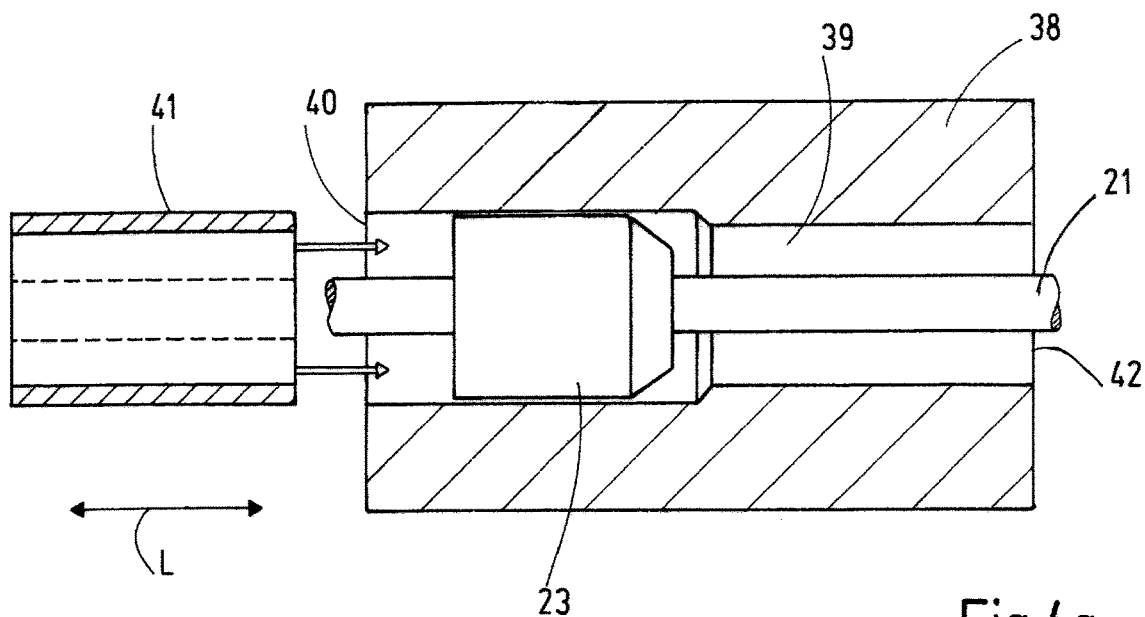
Fig.4a
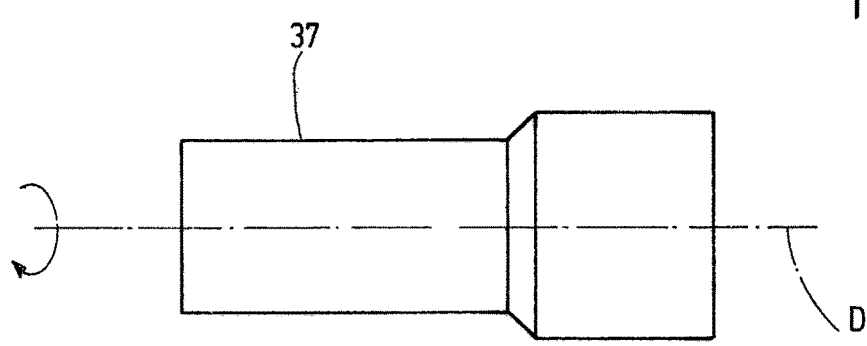
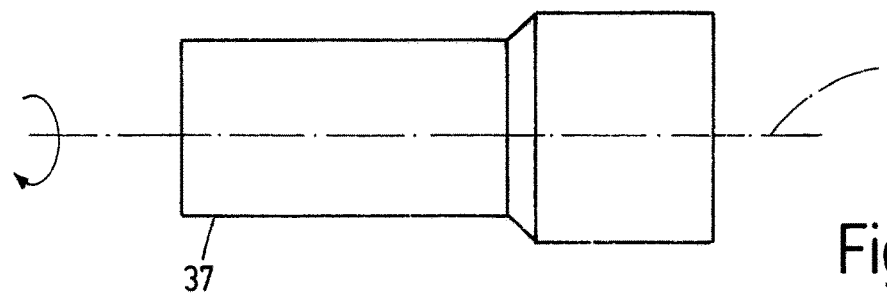
Fig.4b
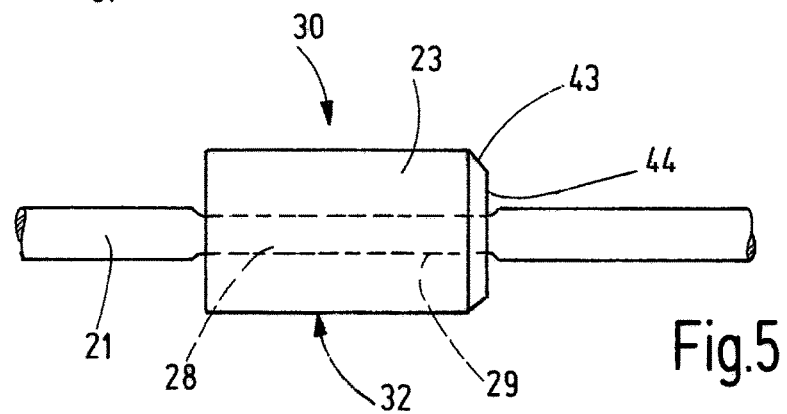
Fig.5

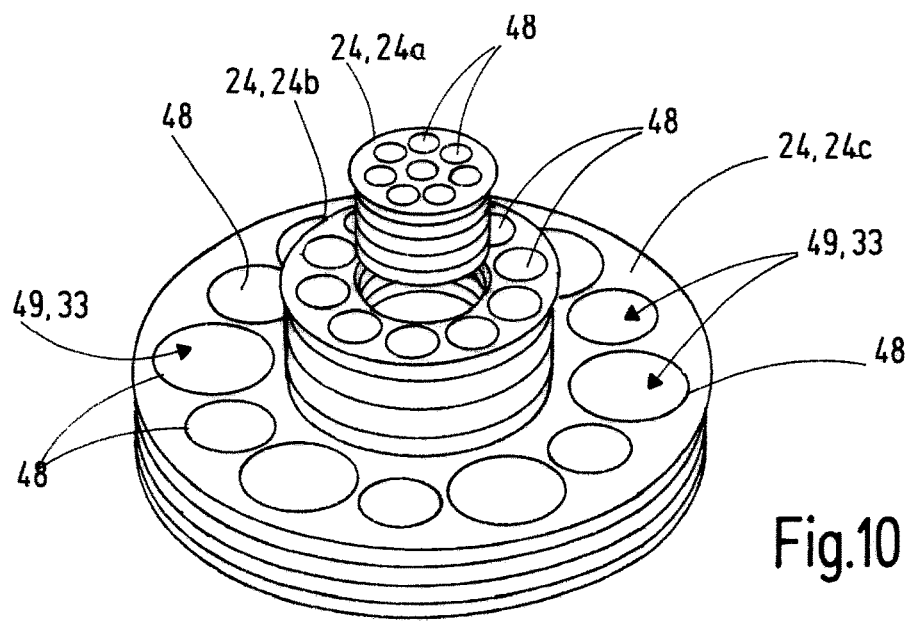
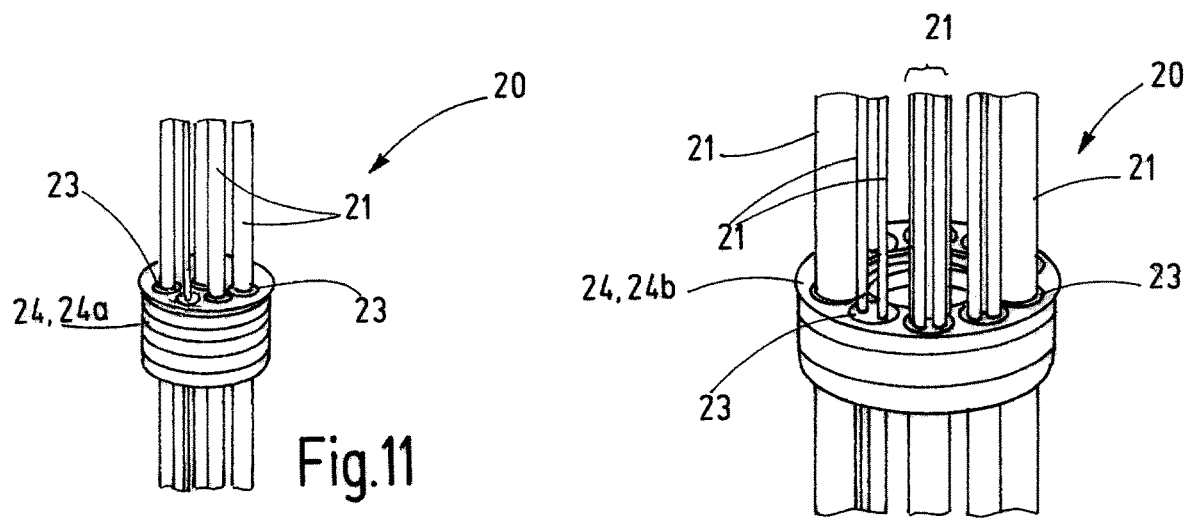
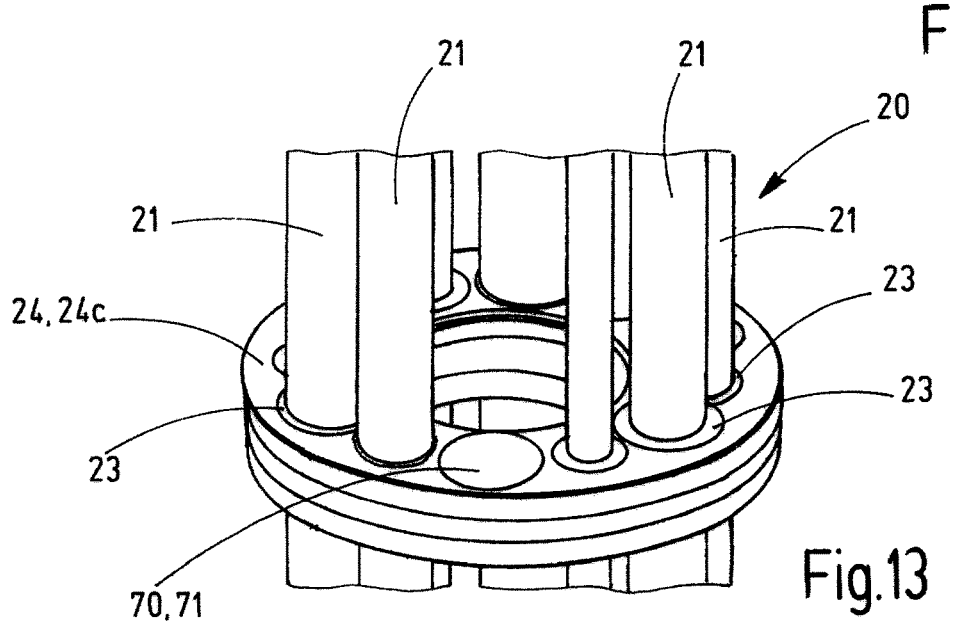

EXPLOSION-PROOF ASSEMBLY AND METHOD FOR PRODUCING SAME

FIELD OF THE INVENTION

The present invention relates to an explosion-proof assembly and a method for producing such assemblies.

BACKGROUND OF THE INVENTION

Explosion-proof assemblies are used to guide a conductor device with at least one electrical and/or optical conductor through a bushing part in an explosion-proof manner. The bushing part for example can be an integral part of a wall of an explosion-proof housing. However, the bushing part can also be an insert, which is arranged in turn in a wall of an explosion-proof housing.

The conductor device can be at least one electrical and/or optical conductor with one or more conductors. A plurality of electrical conductors are each electrically insulated.

The guiding of conductors or lines from an atmosphere that is at risk of explosion into an explosion-proof space, for example within an explosion-proof housing, is complex. It must be ensured that there can be no ignition transmission outwardly from the explosion-proof space into the atmosphere at risk of explosion.

An explosion-proof assembly for multicore cables is known from DE 10 2012 111 270 A1. The explosion-proof assembly has a cable connection device with an outer sleeve and an inner sleeve. The sleeves are arranged coaxially relative to one another and the cable is guided through the inner sleeve. The outer sleeve has a crimping portion. This is made of plastically deformable material. The inner sleeve is elastically deformable. An elastic deformation of the inner sleeve arranged between the cable and the outer sleeve is achieved by deforming the crimping portion of the outer sleeve. Since the cable sheathing and the inner sleeve are made of elastically deformable material, a plastic material flow of the inner sleeve and of the cable sheathing is avoided, and thus there can be no setting of the material over a longer period of time. It is thus ensured that the cable is arranged in the cable connection device with flameproof gaps.

OBJECTS AND SUMMARY OF THE INVENTION

It is an object of the present invention to provide an improved explosion-proof assembly which guides a conductor device with at least one conductor through the assembly.

The explosion-proof assembly according to the invention has at least one bushing part, at least one connecting body, and at least one conductor device with at least one electrical conductor and/or at least one optical conductor. The conductor device can have a preferably electrically insulating sheathing, at least in a mounting portion. The conductor device can be a conductor with one or more insulated electrical leads and/or at least one optical leads. It can be formed by a single conductor or a plurality of separate conductors or a cable with a plurality of leads or cores. The at least one conductor can be formed of a single wire or of a plurality of individual wires (stranded wire) or of an optical fibre or an optical fibre bundle. The at least one conductor can also be formed by a bar or a pin or stud.

At least one bushing opening, and preferably a plurality of bushing openings is/are provided in the at least one bushing part. Each bushing opening extends in a longitudinal direction fully through the bushing part and is delimited by a bushing surface. The longitudinal direction relates to a single bushing opening. All provided bushing openings preferably extend parallel to one another through the bushing part so that their longitudinal directions are oriented parallel to one another.

A connecting body is provided for each conductor device to be guided through the bushing part or one of the provided bushing openings. Each connecting body is connected in the mounting portion to the conductor device in a flameproof manner. This flameproof connection can be a frictionally engaged and/or integrally bonded and/or form-fitting connection. For example, the connecting body can be fitted onto the mounting portion and plastically deformed by a deformation force, whereby the flameproof connection is established. It is also possible to integrally mould the connecting body on the mounting portion. In this case, the connecting body can be produced and at the same time connected in an integrally bonded manner to the conductor device in the mounting portion.

The conductor device can have an electrically insulating sheathing at least in the mounting portion if the connecting body is made of electrically conductive material and if at least one electrical conductor is provided.

Each connecting body, when mounted on the mounting portion, has or forms at least one conductor channel extending through the connecting body in the longitudinal direction. Each conductor channel of a guide body is passed through by one lead or one core or at least one electrical or optical conductor of the conductor device. In the mounting portion, each guided-through conductor can be surrounded and as appropriate electrically insulated by its sheathing. For example, exactly one conductor with an optional sheathing can be guided through each conductor channel.

The outer surface of each connecting body facing away from the mounting portion of the conductor device has a first delimiting surface or forms the first delimiting surface. The bushing surface of each bushing opening has a second delimiting surface or forms the second delimiting surface. Each connecting body is arranged in an associated bushing opening in such a way that its first delimiting surface and the associated second delimiting surface form a flameproof Ex gap. The outer dimensions of the first delimiting surface are adapted to the inner dimensions of the bushing surface so that the flameproof Ex gap is formed by the arrangement of the connecting body or the deformation portion thereof in the bushing opening and in particular by insertion of the connecting body into the bushing opening in the longitudinal direction. This assembly can be produced very easily, economically and quickly.

The Ex gap is not threaded and is formed as an air gap.

At least one securing device is provided, which is designed to secure the associated connecting body at the bushing part against an undesirable relative movement in the longitudinal direction. The connection produced between the at least one connecting body and the associated bushing part is releasable, is not integrally bonded, and is not threaded. In particular, it is thus ensured that the first delimiting surface does not leave the bushing opening, and therefore the length of the Ex gap is maintained in the longitudinal direction. The securing device is preferably designed so that the connection between the at least one connecting body and the associated bushing part can be produced by a relative movement between the connecting body and the bushing part in the longitudinal direction. Here, there is preferably no need for a rotary movement in the circumferential direction about the longitudinal direction, and instead a simple plug-in movement in the longitudinal direction is sufficient.

All provided bushing openings of the bushing part are resistant to ignition transmission. A connecting body is arranged at least in one of the bushing openings. Either there is a connecting body arranged in the further bushing openings or said further bushing openings are closed by a closure means in a flameproof manner. The closure means can completely close the bushing opening or flameproof gaps can remain. The closure means can be a closure body or closure stopper, which is connected to the bushing body in an integrally bonded and/or frictionally engaged and/or form-fitting manner.

Each connecting body is preferably connected in a frictionally engaged and optionally form-fitting manner to the sheathing of the associated conductor device, this being produced by plastically deforming a deformation portion of the connecting body. An integrally bonded connection between the connecting body and the conductor device is preferably not provided. The plastic deformation of the connecting body is achieved in particular by a forming process, such as extrusion or impact extrusion or rolling.

The at least one connecting body can be made of a material containing metal, in particular of steel or a steel alloy. The bushing part can also be produced from a material containing metal or from steel. Alternatively, it can also be produced from plastic. The bushing part is preferably formed by a moulded part. The at least one connecting body and/or the bushing part are/is preferably each produced as integral components without seams or joints. The bushing part can be an integral part of a housing or a housing wall.

It is advantageous if the connecting body rests directly and without a flamegap against the conductor device or the electrical or optical conductor or the sheathing. Further intermediate layers between the at least one conductor device and the connecting body are not necessary.

In particular merely one conductor device is guided through each provided conductor channel. A cable with a plurality of conductors can be freed of the outer casing in order to be guided through, and the individual conductors can each be guided with the aid of a connecting body through respective associated bushing openings or can be guided with the aid of a common connecting body through a common bushing opening. The cable can also be guided as a whole with its sheathing surrounding the conductors through an associated bushing opening by means of a single connecting body.

It is advantageous if the flameproof Ex gap is embodied as an air gap. A filling, for example by a moulded material or adhesive, is spared. It is thus possible to separate the connection between the connecting body and the bushing part in a destruction-free manner.

It is additionally advantageous if the first delimiting surface of the plastically deformed deformation portion and the bushing surface are each embodied as surfaces without indentations and protrusions. The surfaces are embodied as flat surfaces in the longitudinal direction and/or circumferential direction about the longitudinal direction. In particular, the two delimiting surfaces can be thread-free. The Ex gap provided in this embodiment has the contour of an annular gap that is fully or partially closed in the circumferential direction. If the first delimiting surface and the second delimiting surface are arranged coaxially relative to one another, a hollow-cylindrical Ex gap is produced. Grooves or indentations can be provided adjacently to the Ex gap or the delimiting surfaces, for example in order to receive securing elements and/or seals.

The cross-sectional contours of the connecting body or of the deformation portion and of the bushing opening are adapted to one another in order to form the Ex gap. The outer dimensions of the first delimiting surface are preferably slightly smaller than the inner dimensions of the bushing surface so that the deformation portion or the connecting body can be arranged easily in the bushing opening without forming a press fit. Here, the cross-sectional shapes can be selected arbitrarily in principle. The first delimiting surface and the second delimiting surface can thus have a polygonal, oval, elliptical or any other cross-section. It is preferred if the two delimiting surfaces each have a circular cross-section.

In an exemplary embodiment in which the connecting body is connected to the conductor device by plastically deforming the deformation portion of said connecting body, it can be advantageous if the deformation portion extends substantially over the entire length of the connecting body in the longitudinal direction. This is understood to mean a deformation portion of which the length in the longitudinal direction is at least 70% or at least 80% or at least 90% of the total length of the connecting body. In one exemplary embodiment the connecting body, in addition to the deformation portion, also has only an axial end portion at one axial end or both axial ends, which axial end portion for example forms a chamfer in each case. In order to produce the mechanical connection to the conductor assembly, substantially the entire connecting body is thus plastically deformed. For example, the connecting body can be deformed by extrusion or impact extrusion or rolling and thus mechanically connected to the associated conductor device, this being very simple and economical.

The securing device can have a first axial securing means and a second axial securing means. The two axial securing means are arranged at a distance from one another in the longitudinal direction. At least one length portion of the connecting body to be secured is arranged between the two axial securing means.

The securing device preferably does not protrude beyond the outer contour of the bushing part. For example, it can be arranged in the region between the two wall surfaces of the bushing part at each of which the bushing opening opens out. It is possible here to arrange the securing device or the first axial securing means and the second axial securing means at the bushing opening between these two wall surfaces of the bushing part.

The first axial securing means and/or the second axial securing means can comprise at least one securing part that is movable or elastically deformable radially to the longitudinal direction against a pre-tension force. It is thus possible to insert the connecting body into the bushing opening along the longitudinal axis, wherein the at least one securing part moves or deforms radially away from the longitudinal axis and then, once the connecting body has been guided through, moves or deforms back into its starting position towards the longitudinal axis. In this embodiment the Ex gap can be produced particularly easily. For example, an axial securing means can comprise a resiliently deformable snap ring as securing part.

It is sufficient if one of the two axial securing means comprises at least one movable or deformable securing part. The other axial securing means, at the opposite end of the bushing opening, can comprise a radially immovable axial stop at the bushing part. The connecting body can be secured by the immovable axial stop and the at least one securing part against an undesirable movement in the longitudinal direction relative to the bushing part.

In another exemplary embodiment it is also possible if both axial securing means each comprise a radially immovable axial stop.

The at least one radially immovable axial stop is preferably embodied as an integral part of the bushing part.

It is additionally advantageous if the connecting body has a chamfer at least at one axial end. The chamfer is preferably provided only at the axial end associated with the bushing opening of the bushing part prior to the insertion of the connecting body in the longitudinal direction. The radially movable or deformable securing part, for example the snap ring, can thus be splayed open as the connecting body is inserted into the bushing opening and enables the deformation portion or the connecting body to be inserted into the bushing opening easily and without the use of tools.

It is additionally advantageous if a plurality of bushing parts connected or connectable to one another are provided. Each of the bushing parts can comprise one or more bushing openings. The bushing parts can be circular or annular and for example can be arranged concentrically relative to one another. Depending on the number of guide devices to be guided through, it is thus possible to connect one or more bushing parts to one another and for example to insert these in a housing wall. As a result of the connection of a plurality of bushing parts to one another, it is sufficient to provide just one aperture in the housing wall. The bushing parts connected to one another occupy a continuous area, preferably without constrictions, extending at right angles to the longitudinal direction, the contour of said area for example being circular, elliptical, oval or polygonal.

In one embodiment of a bushing part with a plurality of bushing openings, it is also advantageous if some of the bushing openings have opening cross-sections that differ from opening cross-sections of other bushing openings. For example, bushing openings with differently sized, predefined or standardised open cross-sections or opening diameters can be provided.

It is additionally advantageous if, for a bushing opening with a predefined opening cross-section, there are provided a plurality of matching connecting bodies, with an outer cross-section adapted to said cross-section for forming the Ex gap, wherein the at least one conductor channel of a matching connecting body differs from the at least one conductor channel of other matching connecting bodies. For example, the matching connecting bodies can each have a different number of conductor channels and/or the conductor channels of various matching connecting bodies can have different contours or area contents of the channel cross-sections. Conductor devices of different type or with different cross-section can thus be inserted into a specific bushing opening with use of the matching connecting body.

By providing one or more bushing parts each with a plurality of bushing openings of different size and/or by providing a plurality of matching connecting bodies for each bushing opening, a modular system can be constructed in which a multiplicity of conductor devices can be easily and quickly guided, in a versatile manner, through a wall portion in an explosion-proof manner.

The explosion-proof assembly can be produced as follows:

Firstly, at least one bushing part is provided with a plurality of bushing openings. The bushing openings are each delimited in the circumferential direction by a bushing surface.

At least one conductor device with in each case at least one electrical and/or optical conductor and optionally a surrounding sheathing around the at least one conductor is provided. The sheathing can be provided at least in a mounting portion of the conductor device.

A connecting body is connected in a flameproof manner to each conductor device. The connecting body can be connected to the conductor device or the sheathing in the mounting portion in a frictionally engaged and/or form-fitting and/or integrally bonded manner. For example, the connecting body can be plastically deformed in a deformation portion and can be pressed radially inwardly against the conductor device or sheathing so as to produce the frictionally engaged and/or form-fitting connection. On its starting side facing away from the mounting portion, the connecting body comprises a first delimiting surface.

Following the establishment of the mechanical connection between the connecting body and the conductor device, the deformation portion or the entire connecting body is arranged in the bushing opening. The bushing surface of the bushing opening constitutes a second delimiting surface, wherein a flameproof Ex gap is formed between the two delimiting surfaces.

The connecting body is then secured against an undesirably great movement relative to the bushing part in the longitudinal direction.

The optional plastic deformation of the deformation portion or of the connecting body is achieved preferably by extrusion or impact extrusion or rolling.

Other objects and advantages of the invention will become apparent upon reading the following detailed description and upon reference to the drawings.

BRIEF DESCRIPTION OF THE DRAWINGS

FIG. 5 is a side view of a structural unit formed by the connecting body and conductor device, FIG. 10 is a perspective view of an exemplary embodiment of three bushing parts connectable to one another, FIG. 11-13 are exemplary embodiments of explosion-proof assemblies with use in each case of one of the bushing parts shown in FIG. 10.

Figure 1:
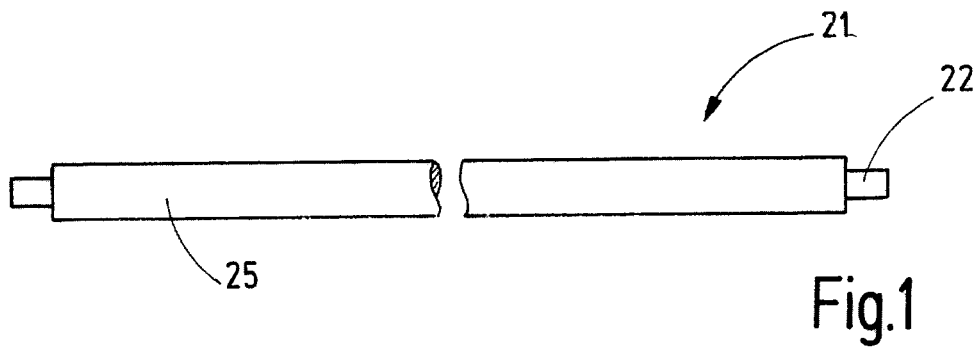
FIG. 1 is a schematic depiction of an exemplary embodiment of a conductor device used in an explosion-proof assembly in accordance with the invention.
Figure 2:
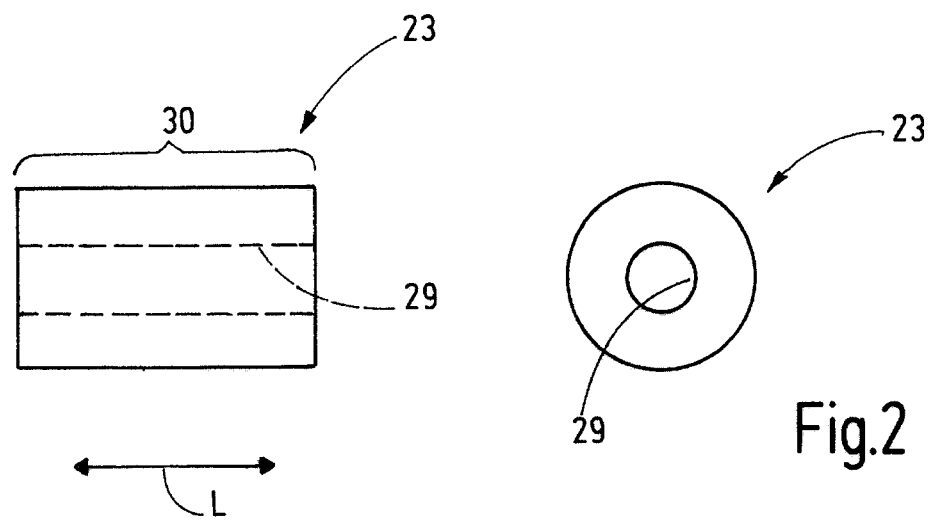
FIG. 2 is a schematic side view of an exemplary embodiment of a connecting body in its non-deformed starting state.

While the invention is susceptible of various modifications and alternative constructions, certain illustrative embodiments thereof have been shown in the drawings and will be described below in detail. It should be understood,

DETAILED DESCRIPTION OF THE PREFERRED EMBODIMENTS

Referring nor particularly to the drawings, and specifically to FIGS. 6, 7, and 11-15, there are shown exemplary embodiments of an explosion-proof assembly 20 in accordance with the invention. The explosion-proof assembly 20 comprises a conductor device 21 with at least one electrical and/or with at least one optical conductor 22, at least one connecting body 23, and at least one bushing part 24.

The explosion-proof assembly 20 is used to guide the conductor device 21 with the at least one electrical and/or with at least one optical conductor 22 in an explosion-proof manner through a wall or a wall portion which separates an explosion-proof space or region from an atmosphere that is at risk of explosion. For example, the wall portion may be a wall portion of an explosion-proof housing, in particular a flameproof encapsulation (Ex d). For this purpose, the at least one bushing part 24 can be an integral part of the wall. It is preferably mounted or can be mounted in the wall in a flameproof manner as a separate component, for example by means of a threaded connection and/or an integrally bonded connection (adhesive bonding, welding, etc.). The outer contour of the separate bushing part 24 is preferably circular.

Each conductor device 21 can be a line with a single electrical and/or optical conductor or with a plurality of electrical and/or optical conductors 22 (FIG. 1). An electrical conductor 22 can be embodied as a one-piece wire or can be formed from a plurality of wires in the form of a stranded wire. An optical conductor 22 can be embodied as an optical fibre or a fibre bundle.

In the exemplary embodiments described here, the at least one conductor 22 is surrounded at least in portions by a sheathing 25, which can be electrically insulating. The at least one conductor 22 can also be formed by a rigid stud which, in contrast to lines or cables, cannot be bent in a flexible manner transversely to its direction of extent by the transverse forces usually occurring.

The conductor device 21 with the at least one conductor 22 is associated in each case with a connecting body 23. The connecting body 23 comprises at least one conductor channel 29 extending fully through the connecting body 23 in a longitudinal direction L. The conductor channel 29 serves to receive a mounting portion 28 of the associated conductor device 21. The connecting body 23 is connected in a flameproof manner to the mounting portion 28 of the conductor device 21 or the sheathing 25. The flameproof connection can exist in the longitudinal direction L along the entire extent of the conductor channel 29 with the mounting portion 28 (for example FIGS. 5 and 6). Alternatively, merely a portion of the conductor channel 29 can also be connected in a flameproof manner to the mounting portion 28 (for example FIGS. 7, 8 and 9). The sheathing 25 can be omitted in the mounting portion 28 if the connecting body 23 is electrically insulating relative to the bushing part 24 or if the conductor device does not comprise any electrical conductors.

Figure 3:
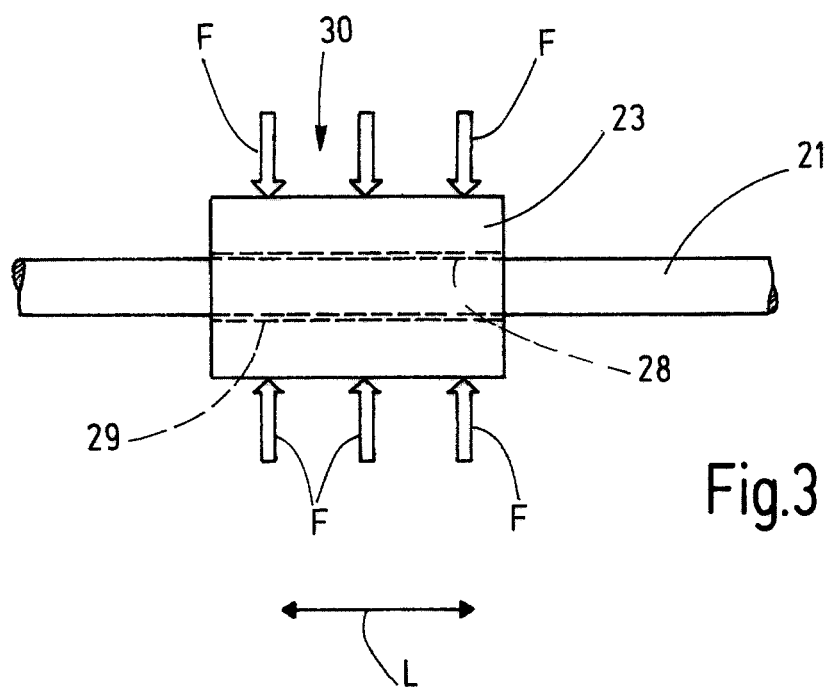
FIG. 3 is a schematic depiction of the flameproof connection of the connecting body shown in FIG. 2 with the conductor device shown in FIG. 1, FIGS. 4a and 4b each show a tool used in and an exemplary method for producing a flameproof connection between a connecting body and a conductor device.

The conductor device 21 in accordance with the example is inserted by means of its free end into the conductor channel 29 in the longitudinal direction L and is guided through completely (FIG. 3). The contour of the conductor channel 29 is adapted to the outer contour of the conductor device 21. In order to guide through a line or a cable, the conductor channel 29 in accordance with the example has a circular cross-sectional contour. In principle, however, any other cross-sectional contours without vertices or with vertices can be provided.

The connecting body 23 has a deformation portion 30. In the exemplary embodiment according to FIGS. 2, 3, 5, 6 and 11-15 the deformation portion 30 extends substantially over the entire length of the connecting body 23 in the longitudinal direction L. In the length portion of the connecting body 23 forming the deformation portion 30, the connecting body 23 is plastically deformed by the action of a mechanical force (FIG. 3). As a result of this plastic deformation, the conductor channel 29 also deforms in the region of the deformation portion 30 and rests in an ignition-gap-free manner against the mounting portion 28 of the conductor device 21 or one of the conductors 22 of the conductor device 21, which optionally can be provided with a sheathing 25. It is possible to guide each conductor 22 of the conductor device 21 through a separate conductor channel 29 of the connecting body 23. If a conductor device 21 has a plurality of conductors 22, the connecting body 23 can thus have a corresponding number of conductor channels 29. Exemplary embodiments for this are depicted schematically in FIG. 11-15. Provided it is compliant with the explosion protection requirements, a conductor device 21 with a plurality of conductors 22, for example a cable, can also be guided through a conductor channel 29 of a connecting body 23.

Figure 7:
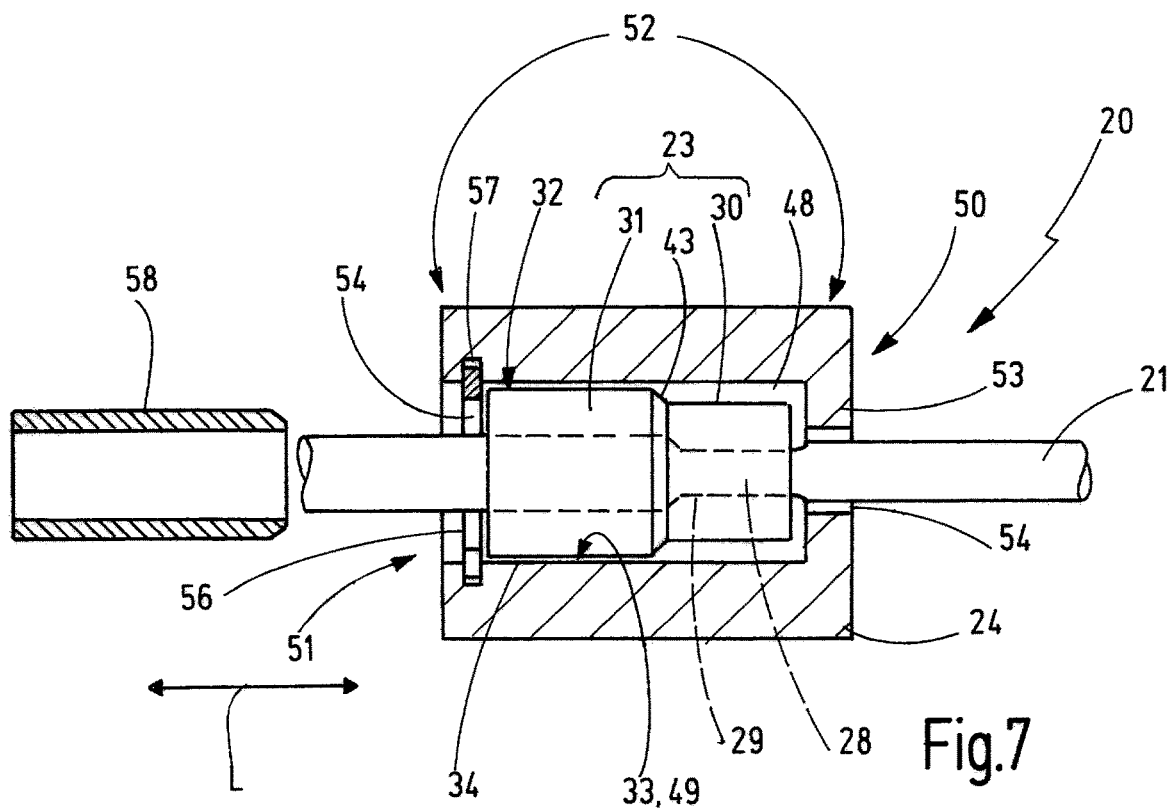
Figure 8:
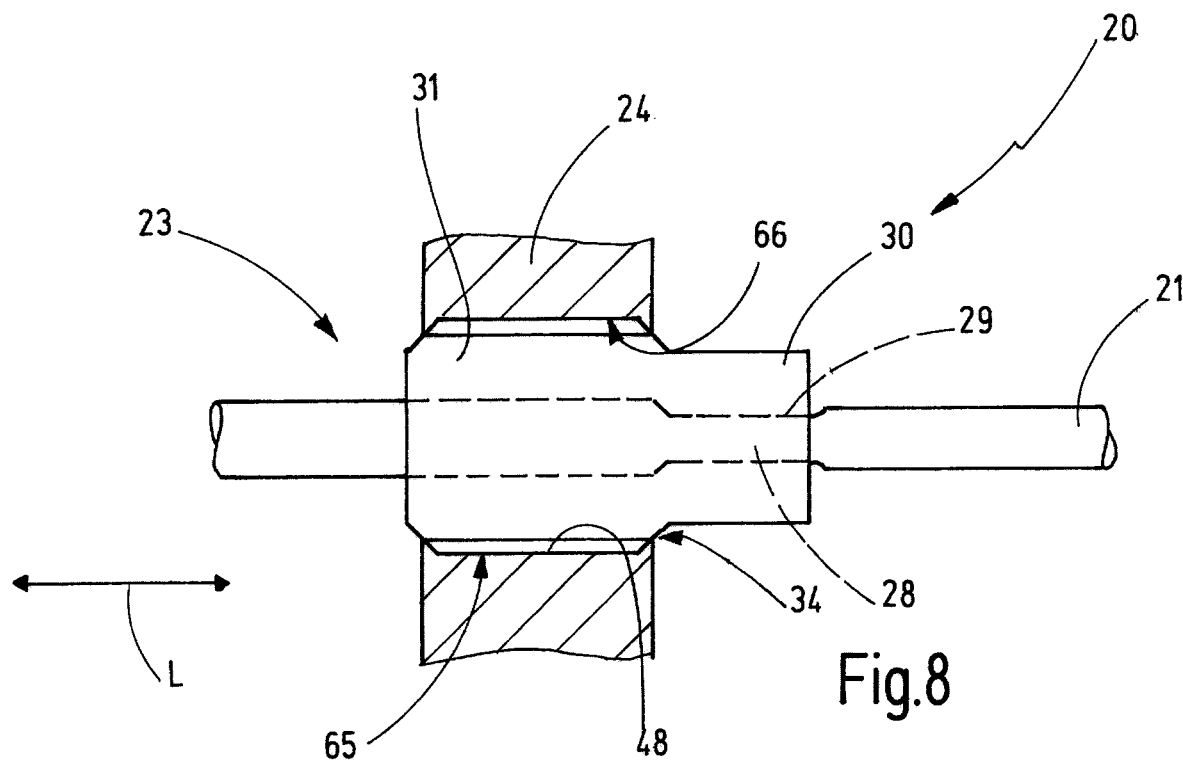
FIGS. 8 and 9 are schematic depictions of an explosion-proof assembly with an Ex gap embodied as a threaded gap.
Figure 9:
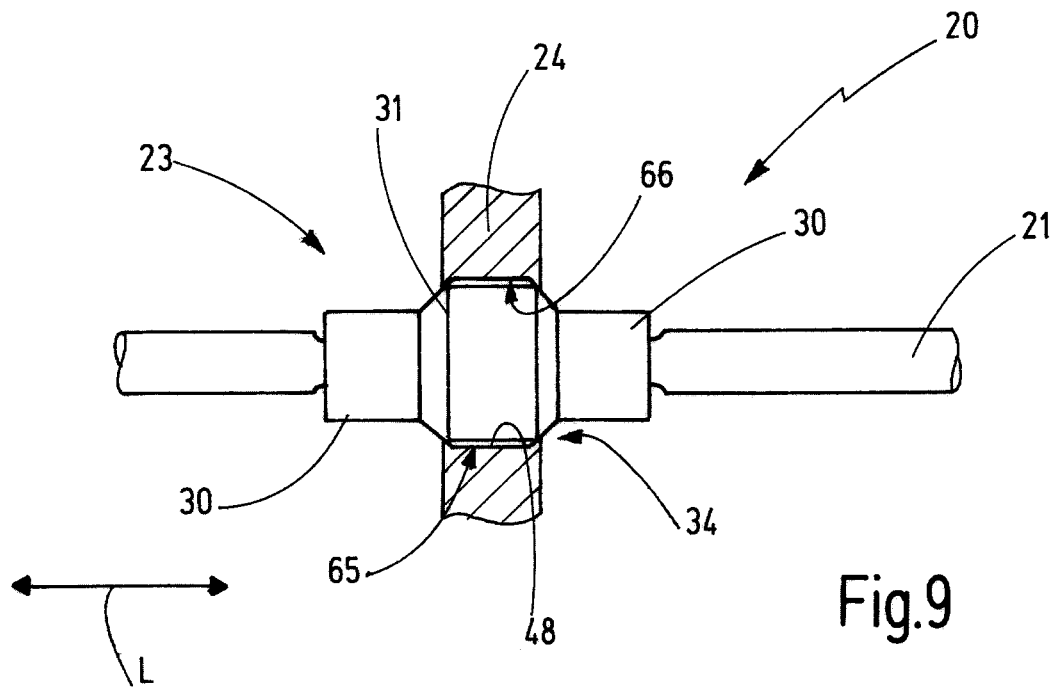

In other exemplary embodiments it is also possible that the connecting body 23, in addition to the deformation portion 30, has a connecting portion 31 (FIGS. 7, 8 and 9). This connecting portion 31 is not used for frictionally engaged connection to the conductor device 21. It can remain non-deformed at the time of the plastic deformation of the deformation portion 30.

A first delimiting surface 32 is provided on the connecting body 23 at least in a region of the side facing away from the mounting portion 28 or the conductor device 21. The first delimiting surface 32 can be formed by the plastically deformed outer surface of the deformation portion 30 (FIGS. 5, 6 and 11-15) or can be provided at the connecting portion 31 (FIGS. 7, 8 and 9).

The first delimiting surface 32 at the connecting body 23 and a second delimiting surface 33, cooperating with the first delimiting surface 32, at the bushing part 24 jointly delimit a flameproof Ex gap 34.

FIG. 4a illustrates a variant by means of which the deformation portion and substantially the entire connecting body 23 can be connected mechanically to the associated conductor device 21 by deformation and the first delimiting surface 32 at the outer surface of the deformation portion 30 can be formed by the deformation operation. In this exemplary embodiment the deformation portion 30 extends practically over the entire length of the connecting body.

The connecting body 23 is formed in accordance with FIG. 4a by extrusion or impact extrusion and in particular by direct extrusion. This process is illustrated in a heavily schematic manner in FIG. 4a. The connecting body 23 and the conductor device 21 guided through the conductor channel 29 are arranged in a mould 38. The mould 38 for this purpose has a deformation channel 39, the cross-section of which at a first end 40 is adapted to the outer cross-section of the deformation portion 30, which has not yet been deformed. The portion outer surface rests against the inner surface of the deformation channel 39 with a small amount of play in the circumferential direction. With the aid of a ram 41, the connecting body 23 is moved along the deformation channel 39, away from the first end 40. The channel cross-section of the deformation channel tapers, causing a material flow. The length of the connecting body 23 increases in the longitudinal direction L, whereas the cross-sectional dimensions in the deformation portion 30 decrease.

Figure 6:
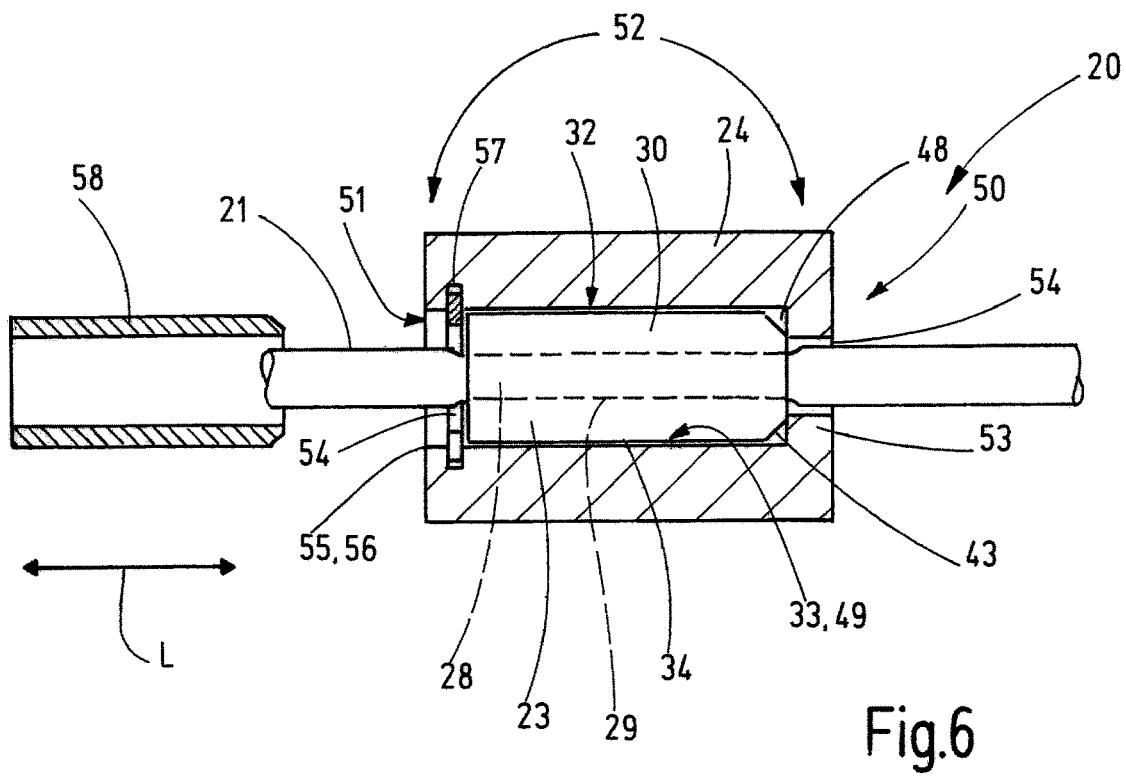
FIGS. 6 and 7 are schematic depictions of an explosion-proof assembly with the structural unit shown in FIG. 5 inserted into an opening of a bushing part.

In the exemplary embodiment described here the first delimiting surface 32 is formed by a circular cylinder lateral surface (FIG. 5-7). The ram 41 can comprise two ram parts arranged concentrically relative to one another (FIG. 4a) so as to move the connecting body 23 completely through the narrow point in the deformation channel 29 and for example also to completely press said connecting body through the deformation channel 29 in a single direction. Alternatively, it is also possible to provide an ejector at the second end 42 of the deformation channel 39 opposite the first end 40, which ejector moves the plastically deformed connecting body 23 back in the direction of the first end 40 and out from the mould 38.

The plastic deformation of the deformation portion 31 of the connecting body 23 can also be performed by rolling of the deformation portion 31 between two rolling tools 37—as illustrated schematically in FIG. 4b. Rollers that rotate about respective axes of rotation D are illustrated in FIG. 4b as rolling tools by way of example. The degree of deformation of the deformation portion 31 can be predefined by the distance between the two axes of rotation D. Alternatively to the use of rollers, the deformation portion 30 could also be rolled between two planar rolling tools, the distance between which predefines the degree of deformation and which move relative to one another in parallel alignment, so that the deformation portion 30 is rolled between the planar rolling tools.

An embodiment of the connecting body 23 which comprises a chamfer 43 adjacently to the first delimiting surface 32 of the deformation portion 30 is illustrated in FIGS. 5, 6 and 7. The chamfer 43 on the one hand directly adjoins the first delimiting surface 32 and on the other hand directly adjoins an end face 44 of the connecting body 23 (FIGS. 5 and 6) or adjoins a portion of the connecting body 23 of smaller radial dimensions (FIG. 7). The chamfer 43 extends at an incline or at right angles to the longitudinal direction L and can form a truncated-cone lateral surface.

The end face 44 is embodied as a flat annular face and surrounds a mouth of the conductor channel 29. The connecting body 23 can consist exclusively of two length portions, specifically an axial end portion formed by the chamfer 43 and the deformation portion 30 with the first delimiting surface 32 in the form of a cylinder lateral surface. The deformation portion 30 thus extends substantially over the entire length of the connecting body 23. This is to be understood to mean that the length of the deformation portion 30 accounts for the greatest part of the total length of the connecting body, for example at least 70%, 80% or 90%, and in accordance with the example additionally merely the chamfer 43 is provided. As explained above, the deformation body 23, besides the deformation portion 30, can also comprise a connecting portion 31, wherein the chamfer 43 can connect the two portions 30, 31 (FIG. 7).

In the case of the exemplary embodiment described here, the entire connecting body 23 is made of a plastically deformable material and is produced integrally, without seams or joints. In a variation, it could be sufficient in exemplary embodiments of the connecting body 23 if the deformation portion 30 is made of a plastically deformable material. In accordance with the example the connecting body 23 is produced from a metal or a metal alloy and preferably from steel. In order to avoid an electrical connection to an electrical conductor 22, an electrical insulation can be provided by the sheathing 25, at least in the region of the conductor channel 29.

As explained, a mechanical and in accordance with the example frictionally engaged connection is produced between the connecting body 23 and the associated conductor device 21 by the plastic deformation of the deformation portion 30. Optionally, a form-fitting connection can also be created here, this being dependent on the shaping of the conductor device 21 or of the sheathing 25. The sheathing 25 can be elastically deformable and for example can be made of plastic. As a result of the mechanical, frictionally engaged and/or form-fitting connection between the connecting body 23 and the conductor device 21, the channel inner surface delimiting the conductor channel 29 rests preferably directly against the conductor device 21 or sheathing 25 thereof. The sheathing 25 is preferably formed by a single layer, which surrounds the at least one conductor 22. Cables can also be freed of their cable sheathing, and the conductors, for example the insulated cores, can each be guided separately through a conductor channel 29 of a respective connecting body 23, if this is necessary for reasons related to providing protection against explosion. Depending on the used cable, the number of conductors, the materials, etc., however, a single connecting body can be arranged on the cable sheathing surrounding the cores and can be connected thereto in a flameproof manner and guided through a bushing opening 48.

The bushing part 24 has a plurality of bushing openings 48, which are each delimited in the circumferential direction about the longitudinal direction L by a bushing surface 49. The bushing surface 49 forms the second delimiting surface 33 for forming the Ex gap 34. By arranging the connecting body 23 or the deformation portion 30 with the first delimiting surface 32 in the bushing opening 48 with the bushing surface 49, the delimiting surfaces 32 and 33 facing one another delimit the Ex gap 34.

An example of such an arrangement is shown in FIGS. 6 and 7. The Ex gap 34 is formed there as an annular gap between the first delimiting surface 32 of the connecting body 23 and the second delimiting surface 33 of the bushing opening 48. The first delimiting surface 32 and the second delimiting surface 33 are embodied in accordance with the example as flat surfaces in the longitudinal direction L and in the circumferential direction about the longitudinal direction L, free from protrusions or indentations.

The Ex gap 34 is an air gap. There is no integrally bonded connection between the connecting body 23 and the bushing part 24.

To axially secure the connecting body 23 in the bushing opening 48, a securing device 52 can be provided. The securing device 52 has a first axial securing means 50 and a second axial securing means 51 in the exemplary embodiment, which are arranged at a distance from one another in the longitudinal direction L. At least one portion of the connecting body 23 is arranged between the two axial securing means 50, 51 and is secured against an undesirable axial movement in the longitudinal direction L. In accordance with the example at least the part of the connecting body 23 comprising the first delimiting surface 32 is arranged between the two axial securing means 50, 51 (FIGS. 6 and 7).

The first axial securing means 50 comprises a first stop 53, which delimits the bushing opening 48 in the longitudinal direction L at one end and protrudes radially inwardly. The first stop 53 has a hole 54 for guiding through the conductor device 21. The dimensions of the hole 54 are selected so that the connecting body 23 does not pass through and is delimited with regard to its axial movement in the longitudinal direction L by the stop 53.

On the side opposite the first stop 53, the bushing opening 48 is delimited by a second stop 55 of the second axial securing means 51. The distance in the longitudinal direction L between the two stops 53, 55 is at least as great as the length of the deformation portion 30 of the connecting body 23. In the exemplary embodiment according to FIGS. 6 and 7 the connecting body 23 is disposed completely between the two stops 53, 55. In a variation, at least part of the connecting body could also protrude beyond at least one of the two stops 53, 55 in the longitudinal direction L.

Similarly to the first stop 53, the second stop 55 also has a hole 54 for guiding through the associated conductor device 21. The second stop 55 in accordance with the example is formed by a securing part 56 which is elastically deformable or expandable radially to the longitudinal direction L and in accordance with the example by a spring elastic snap ring. The snap ring is C-shaped and is not completely closed in the circumferential direction about the longitudinal direction L, but is slotted at a point, so that it can be expanded in order to allow the connecting body 23 to be passed through. In its non-expanded rest state, it delimits a hole 54, the cross-sectional dimension of which is smaller than that of the connecting body 23 or the deformation portion 30, so that it can limit the axial movement in the longitudinal direction L of the connecting body 23. The securing part 56 formed by the snap ring sits in a circumferential groove 57 of the guide-through part 24, which is open radially inwardly. The snap ring, in its non-expanded starting state, protrudes radially inwardly from the circumferential groove 57. In order to expand the snap ring, said ring sits in the circumferential groove 57 with play.

Alternatively to the resiliently deformable snap ring, at least one securing part 56 movable radially to the longitudinal direction L against a pre-tension force could also be provided, said securing part protruding into the bushing opening 48. A plurality of securing parts 56 of this kind can also be arranged in the circumferential direction about the longitudinal direction L.

In this embodiment the provision of the chamfer 43 on the connecting body 23 is advantageous. The minimum diameter of the chamfer 43 is smaller than the distance of the at least one securing part 56 from the longitudinal axis through the bushing opening 48 or smaller than the inner diameter of the snap ring in its starting state. The at least one securing part 56 or the snap ring can be moved radially outwardly or elastically deformed via the chamfer 43 as the connecting body 23 is inserted into the bushing opening 48 and can thus slide along the chamfer 43 during the insertion process. If at least the portion 30 or 31 with the first delimiting surface 32 or the entire connecting body 23 is inserted, the snap ring 56 no longer rests against the first delimiting surface 32 and assumes its non-expanded starting state, which is shown in FIGS. 6 and 7.

With the aid of a sleeve 58 or a comparable tool, the snap ring 56 can be expanded and the connecting body 23 can be removed from the bushing opening 48. The securing against axial movement via the securing device 52 is embodied in accordance with the example so that the prevention of movement between the connecting body 23 and the bushing part 24 in order to limit the relative movement in the longitudinal direction L is releasable.

The securing device 52 does not have to be embodied so that all relative movement between the connecting body 23 and the bushing part 24 is avoided. It is sufficient to limit the relative movement in such a way that the Ex gap 34 is not reduced, so as not to compromise the resistance to ignition transmission.

The securing device 52 in accordance with the example does not protrude beyond the outer contour of the bushing part 24. It is arranged in the region between the two wall faces of the bushing part 24 at each of which the bushing opening 48 opens out. As explained beforehand with reference to the exemplary embodiment, the axial securing of the connecting body 23 at the bushing part 24 or in the bushing opening 48 is provided generally in an unthreaded manner and without integrally bonded connection. A releasable and reproducible connection or securing is achieved.

FIGS. 8 and 9 schematically depict further variants of the explosion-proof assembly 20, not according to the invention, in a heavily simplified manner. In the previously described embodiment and also the exemplary embodiments in FIGS. 9 and 11, the delimiting surfaces 32, 33 are each cylindrical and preferably circular cylindrical. They are embodied as flat surfaces, which in the preferred exemplary embodiments are embodied without edges and without indentations or protrusions. In a variant, it is also possible to provide an outer thread 65 on the first delimiting surface 32 and an inner thread 66 on the second delimiting surface 33. In this embodiment the connecting body 23 with the outer thread 65 is screwed into the inner thread 66 of the bushing part 24. The Ex gap 34 is embodied here as a threaded gap. This screw connection at the same time constitutes a means for securing against an undesirable relative movement in the longitudinal direction L. The securing device 52 is formed in this case by the thread 65, 66.

In some preferred exemplary embodiments the connecting body 22 has a single deformation portion 30. In FIG. 9 an alternative exemplary embodiment is depicted, in which two deformation portions 30 are provided. The connecting portion 31 is arranged in the longitudinal direction L between the two deformation portions 30. When establishing the frictionally engaged flameproof connection between the connecting body 23 and the conductor device 21, a redundancy can be achieved by this exemplary embodiment. Each connection between a connecting portion 30 and the conductor device 21 in itself meets the standard requirements for resistance to ignition transmission.

In the previously described embodiments the connecting body 23 is connected to the mounting portion 28 of the conductor device 21 by plastic deformation of a deformation portion 30. Alternatively, it is also possible to produce the connecting body 23 by means of a deformation process and at the same time to connect it to the conductor device 21. For example, the connecting body 23 can be integrally moulded on the conductor device 21 and in particular the sheathing 25 of the conductor device 21.

A modular system for an explosion-proof assembly 20 is illustrated in FIGS. 10-15. A bushing part 24 can comprise a plurality of bushing openings 48. These bushing openings 48 preferably have different cross-sectional dimensions or in accordance with the example different diameters, at least in part. Depending on the cross-section of the conductor device 21 to be guided through, a bushing opening 48 of sufficient size can be selected. Each bushing opening 48 is associated with a corresponding connecting body 23, which, following the plastic deformation of the portion outer surface thereof, has a first delimiting surface 32, which is adapted to the corresponding inner diameter of the bushing surface 49—this forming the second delimiting surface 33—so that the Ex gap 34 is formed at the time of insertion (FIGS. 11-15).

The axial securing of the connecting body 23 can be provided, as illustrated in FIGS. 6 and 7, by the securing device 52 with the two axial securing means 50, 51 or alternatively by a threaded connection according to FIGS. 8 and 9, which is not illustrated in the basic depictions of FIG. 10 to 15.

For a bushing opening 48 with a predefined inner diameter it is advantageous to provide a plurality of connecting bodies 23 that have different numbers of conductor channels 29 and/or conductor channels 29 with differently sized inner diameters and/or cross-sectional contours. As a result, multiple combination possibilities can be achieved in order to guide the wide range of different conductor devices 21 through a provided bushing opening 48 in a flameproof manner. The number of these possibilities is further increased in that—as described above—a plurality of bushing openings 48 can be provided which can have different inner diameters. For example, connecting bodies 23 can thus be adapted to the guiding through of standard conductors or standard cables in that they provide one or more conductor channels 29 of appropriate number and/or size. The outer dimensions of the deformation portion 31 prior to the plastic deformation thereof are selected so that a sufficient material thickness remains for the plastic deformation depending on the size and number of the conductor channels 29. The size of the bushing openings 48 in the bushing part 24 is in turn adapted accordingly to the outer dimension of the first delimiting surface 32. Here, it can also be taken into consideration that the bushing openings 48 can be produced in the bushing part 24 in a standard size using tools (for example drills, millers or the like).

Figure 14:
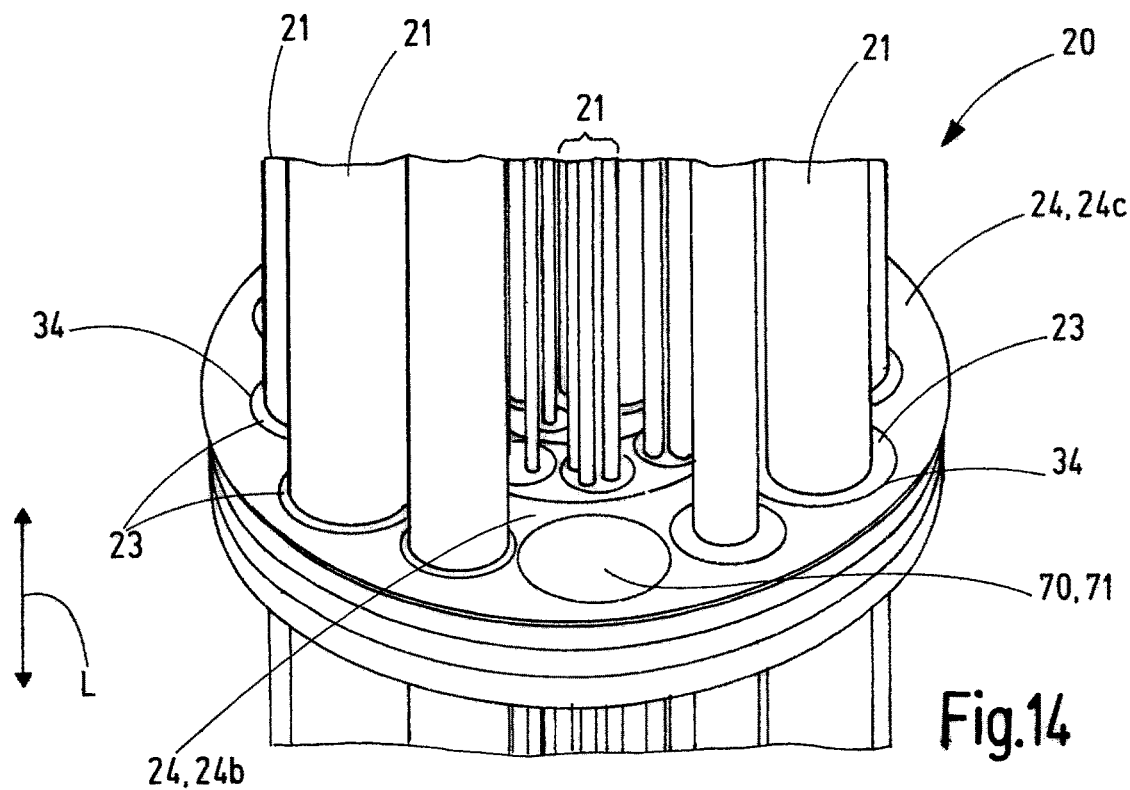
FIG. 14 is a perspective of an exemplary embodiment of an explosion-proof assembly with a plurality of bushing parts shown in FIG. 10-13 connected to one another.
Figure 15:
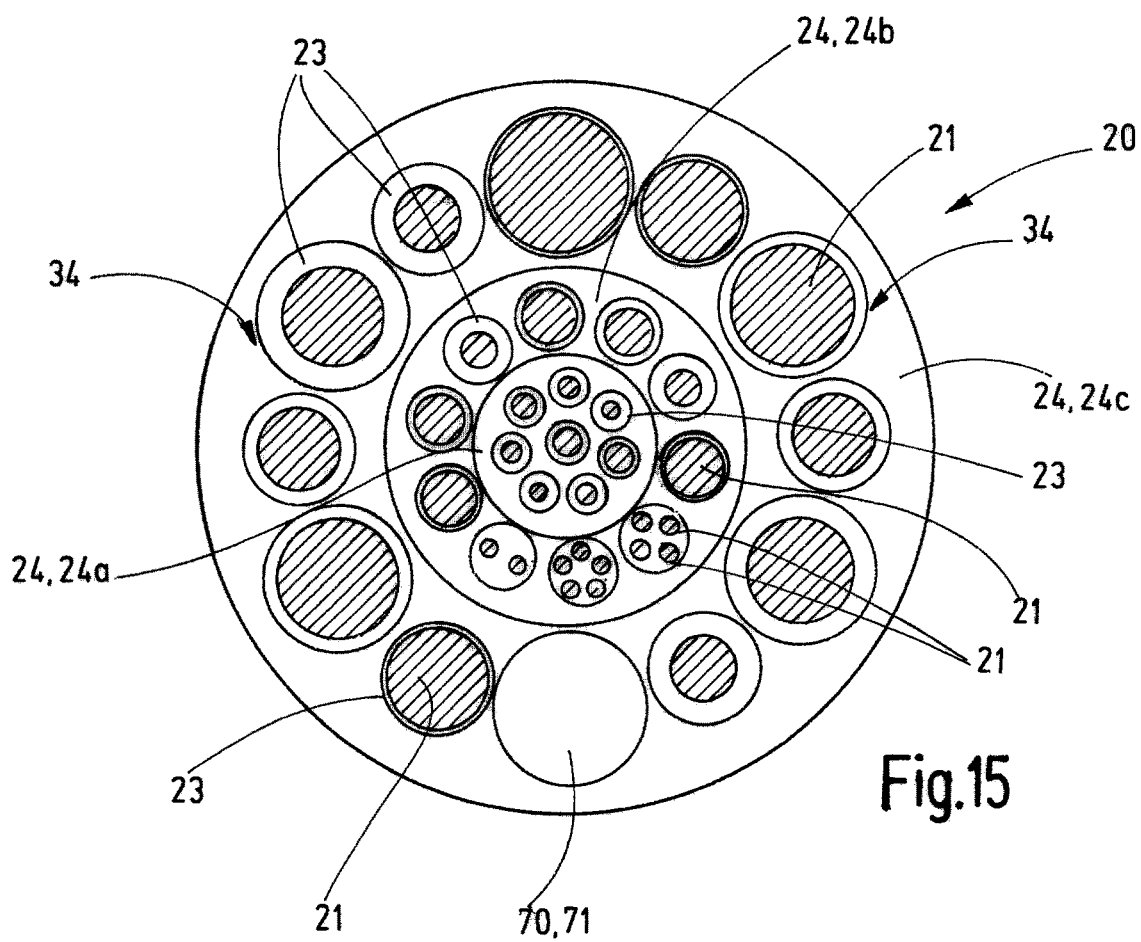
FIG. 15 is a plan view of the bushing parts shown in FIG. 14, with the conductor devices in cross-section.

It can be seen in FIGS. 13-15 that bushing openings 48 of this kind in the bushing part 24 that are not required for the guiding through of a conductor device 21 are closed partially or fully in a flameproof manner, so as to maintain the protection against explosion. The ignition-gap-free closure of a bushing opening 48 in which there is no connecting body 23 arranged is provided with the aid of a closure means 70. For example, a closure stopper 71, which is preferably made of elastically deformable material and is arranged in a frictionally engaged and/or form-fitting manner in the associated bushing opening 48 is used in accordance with the example as closure means 70. Additionally or alternatively, a closure means 70 can also be fixed in the corresponding bushing opening 48 in an integrally bonded manner.

It can be seen in FIGS. 10, 14 and 15 that a plurality of bushing parts 24 that are connected or can be connected to one another can also be used for an explosion-proof assembly 20. In accordance with the example, bushing parts 24 that are arranged concentrically or coaxially relative to one another are provided and can be fitted one inside the other. The bushing parts 24 can be connected to one another in a frictionally engaged and/or form-fitting and/or integrally bonded manner in order to ensure that there is no flamegap remaining between two bushing parts 24 connected to one another.

In accordance with the example the bushing parts 24 are in the form of a circular plate or are ring-shaped. The radially innermost, first bushing part 24a is embodied in the form of a circular plate. A circular ring-shaped second bushing part 24b is arranged coaxially relative to the first bushing part 24a and is connected to the first bushing part 24a in a flameproof manner. In the exemplary embodiment a circular ring-shaped third bushing part 24c is provided, which is in turn arranged coaxially relative to the two other bushing parts 24a, 24b and is connected in a flameproof manner to the second bushing part 24b. The number of circular ring-shaped bushing parts can be selected arbitrarily in principle.

Depending on the number and/or size of the conductor devices 21 to be guided through, one or more matching bushing parts 24 is/are selected, and—if a plurality of bushing parts 24 are used—are connected to one another so that a continuous planar assembly of the bushing parts 24 is produced. A corresponding recess is produced in the wall or the wall portion, and the bushing parts 24 are arranged therein.

A plurality of conductor devices 21 can also be guided in an explosion-proof manner through a wall or a wall portion with the aid of the at least one bushing part 24 by means of this embodiment, wherein it is sufficient to provide or to form one recess in the wall or the wall portion.

The bushing parts 24 can be made of metal, a metal alloy, or a plastic material, or a composite material. In one exemplary embodiment the at least one bushing part 24 is embodied as a moulded part, for example as an injection moulded part.

From the foregoing, it can be seen that an explosion-proof assembly 20 is provided which is designed to guide at least one conductor device 21 through a wall in a flameproof manner. The assembly 20 has at least one bushing part 24 with one or more bushing openings 48, each of which is delimited in the circumferential direction by a bushing surface 49. The at least one bushing part 24 is designed to be arranged in the wall. A connecting body 23 is associated with each conductor device 21 and coaxially surrounds the conductor device in a mounting portion 28 in a manner forming an ignition-gap-free connection. The connecting body 23 has a first delimiting surface 32. The bushing surface 49 represents a second delimiting surface 33. A flameproof Ex gap 34 is formed between the two delimiting surfaces 32, 33 by the at least partial insertion of the connecting body 23 into the bushing opening 48. The bushing openings 48 of the bushing part 24 in which there is no connecting body 23 arranged without a flamegap are closed in a flameproof manner by a closure means 70. A securing device 52 secures the connecting body 23 in the bushing opening 48.

LIST OF REFERENCE SIGNS 20 explosion-proof assembly
21 conductor device
22 conductor
23 connecting body
24 bushing part
24a first bushing part
24b second bushing part
24c third bushing part
25 sheathing
28 mounting portion
29 conductor channel
30 deformation portion
31 connecting portion
32 first delimiting surface
33 second delimiting surface
34 Ex gap
37 rolling tool
38 mould
39 deformation channel
40 first end of the deformation channel 41 ram
42 second end of the deformation channel
43 chamfer
44 end face
48 bushing opening
49 bushing surface
50 first axial securing means
51 second axial securing means
52 securing device
53 first stop
54 hole
55 second stop
56 securing part
57 peripheral groove
58 sleeve
65 outer thread
66 inner thread
70 closure means
71 closure stopper
D axis of rotation
F forming force
L longitudinal direction

The invention claimed is:

1. An explosion-proof assembly (20) comprising:
an explosion-proof housing that separates a space from an atmosphere that is at risk for an explosion,
said explosion-proof housing having a wall portion,
at least one bushing part (24) mounted in said wall portion in a flameproof manner having at least one bushing opening (48) with a bushing surface (49),
at least one piece connecting body (23) having at least one conductor channel (29) extending through the connecting body (23) in a longitudinal direction (L),
at least one conductor device (21) having a mounting portion (28) and which extends longitudinally through the at least one conductor channel (29), said at least one conductor device (21) having at least one electrical and/or optical conductor (22),
said at least one bushing part (24) being immovably arranged on the housing wall portion against movement in the longitudinal portion (L);
said at least one piece connecting body (23) being connected in a flameproof manner with the mounting portion (28) of the associated conductor device (21) and being inserted into the at least one bushing opening (48),
said connecting body (23) having a plastically deformed deformation portion (30) surrounding the mounting portion (28) of the conductor device (21) with an outer side facing away from the conductor device (21) that defines a first delimiting surface (32) which forms a flameproof Ex gap (34) with a second delimiting surface (33) formed by the bushing opening (48), said first delimiting surface (32) and said second delimiting surface (33) being planar surfaces in circumferential and longitudinal directions without indentations or protrusions, and
at least one securing device (52) providing an unthreaded, releasable and non-integrally bonded connection between said connecting body (23) and the bushing part (24) so as to limit movement in the longitudinal direction (L) of the connecting body (23) relative to the at least one bushing part (24).

2. The explosion-proof assembly of claim 1 in which said at one bushing opening (48) comprises a plurality of bushing openings (48), and at least one of the plurality of bushing openings (48) is made resistant to ignition transmission by a closure member (70).

3. The explosion-proof assembly of claim 1 in which the conductor device (21), at least along the mounting portion (28), has a sheathing, (25) that is electrically insulating and against which the connecting body (23) rests directly and without a flamegap.

4. The explosion-proof assembly of claim 1 in which said first delimiting surface (32) surrounds the mounting portion (28) in which the flameproof connection between the connecting body (23) and the conductor device (21) exists.

5. The explosion-proof assembly of claim 1 which the at least one conductor device (21) extends through the at least one conductor channel (29) with a flameproof encapsulation (Ex d).

6. The explosion-proof assembly of claim 1 in which the flameproof Ex gap (34) is an air gap.

7. The explosion-proof assembly of claim 1 in which said first delimiting surface (32) and said second delimiting surface (33) in cross-section each have a curved contour.

8. The explosion-proof assembly of claim 1 which said at least one securing device (52) is at least in part an integral part of the bushing part (24).

9. The explosion-proof assembly of claim 1 in which the at least one securing device includes at least one of the first axial securing means (50) and the second axial securing means (51) has an axial stop (53) that is rigid radially to the longitudinal axis of the bushing opening (48).

10. The explosion-proof assembly of claim 1 in which said at least one bushing part (24) has a flame-proof threaded connection with said housing wall portion.

11. The explosion-proof assembly (20) of claim 1 in which
said at least one bushing part (24) has a flame-proof integrally bonded connection with said housing wall portion.

12. The explosion-proof assembly of claim 1 in which said at least one bushing part (24) is an integral part of said housing wall portion.

13. The explosion-proof assembly of claim 1 in which said securing device 52 has an elastically expandable securing part 56 that in a non-expanded rest state defines a hole 54 smaller in cross-section than the connecting body 23.

\* \* \* \* \*